3,460,151
DISPLACEMENT OF OSCILLOGRAPHIC TRACES
John A. Stafford, Houston, Tex., assignor to Schlumberger Technology Corporation, Houston, Tex., a corporation of Texas
Filed Aug. 14, 1967, Ser. No. 660,444
Int. Cl. G01d 9/42; E21b 47/00
U.S. Cl. 346—1    4 Claims

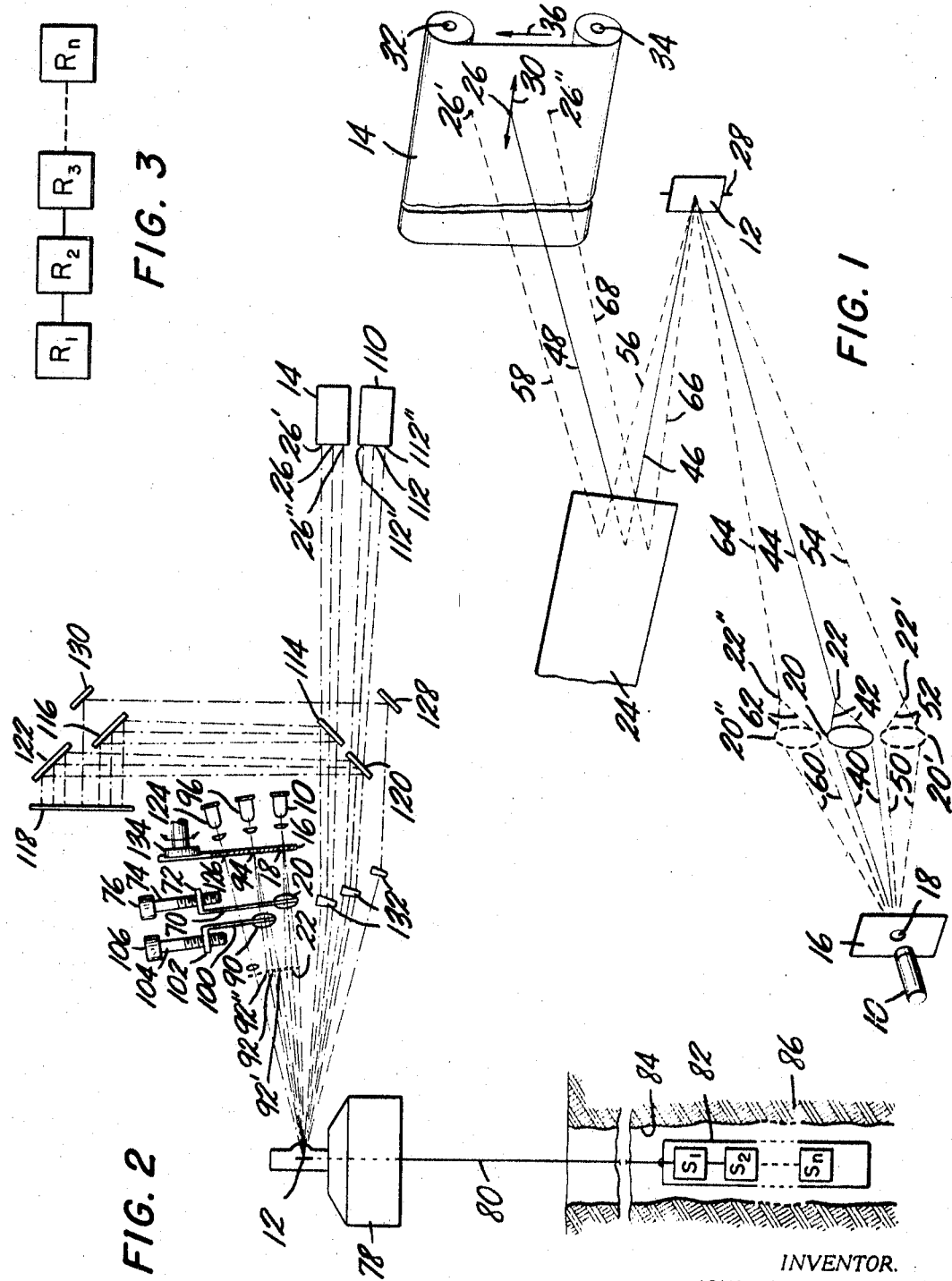

ABSTRACT OF THE DISCLOSURE

A lens forms a real image of a light source, and the image is reflected by a mirror onto a moving photographic film used to make a well log. The mirror is caused to pivot back and forth in a pattern representative of information from a sensor in a well bore. An oscillographic trace is thus formed on the film. The lens referred to above is movable to adjust the location of the trace. Additional mirrors similarly generate additional oscillographic traces representative of information from additional sensers vertically spaced apart in the well bore. A separate movable lens is associated with each trace. By adjusting the positions of the lenses, the traces are shifted along the depth axis of the well log to compensate for the depth separation of the downhole sensing devices.

Background of the invention

This invention relates to recording apparatus and methods and, in particular, to novel and highly-effective apparatus and methods facilitating recording of information from sensors located in a well bore.

Means are known for recording information from sensors in a well bore and are disclosed, for example, in a patent to Stafford et al. No. 3,142,528 and a patent to Lebourg No. 3,158,428. Conventional recording apparatus and methods fail, however, to make adequate provision for compensation for the depth separation of the downhole sensing devices.

It is customary, for reasons of economy and efficiency, in constructing a well log, to lower a number of sensing devices simultaneously into a well bore and to record information simultaneously from the sensing devices on a recording medium such as photographic film. It is desirable that oscillographic traces corresponding to information from the several sensers be arranged on the film in prescribed relative positions. For reasons understood by those skilled in the art, the sensers are usually vertically spaced apart, and the separation between the uppermost senser and the lowermost senesr may well be as much as thirty feet. The separation between adjacent sensers is not necessarily the same during the recording of different well logs, and the problem of compensating for the depth separation of the sensing devices has not heretofore been satisfactorily solved.

It is desirable that in the completed well log the separate oscillographic traces be properly aligned with one another; that is, at any given point along the depth axis of the log, all of the oscillographic traces should represent information transmitted from the same well depth.

A principal object of the invention is to provide novel apparatus and methods facilitating shifting the position of oscillographic traces along the depth axis of a well log to compensate for the depth separation of the downhole sensing devices being simultaneously recorded. Another object of the invention is to permit independent adjustment of the position of each of a number of oscillographic traces to any value within a limited range.

Summary of the invention

The foregoing and other objects of the invention are attained in a representative embodiment thereof by the provision of apparatus having a radiation source, a radiation-responsive recording medium in spaced-apart relation to the radiation source, and channeling means operatively associated with the radiation source and the recording medium for channeling radiation from the radiation source to the recording medium to form an image on the recording medium. At a remote location, sensing means is provided for sensing a characteristic to be recorded, and the channeling means includes a galvanometer responsive to the sensing means for effecting a first displacement, normally horizontal, of the image on the recording medium in accordance with information from the sensing means. In accordance with the invention, compensating means is provided for effecting a second displacement, normally vertical, of the image on the recording medium to compensate for displacement of the sensing means from a reference position, and adjusting means is provided for adjusting the compensating means so that the second displacement can be made to assume any value within prescribed limits.

The method of the invention includes the steps of directing radiation from first and second light sources to first and second lenses, respectively, to form first and second real images in space, and reflecting the first and second images by first and second mirror means, respectively, onto photosensitive film means. The first and second mirror means are moved to generate first and second oscillographic traces, respectively, on the film means. In accordance with the invention, at least one of the first and second lenses is moved to adjust the relative depth position of the traces.

Brief description of the drawing

An understanding of additional aspects of the invention may be gained from a consideration of the following detailed description of a representative embodiment thereof, in conjunction with the accompanying figures of the drawing, in which:

FIG. 1 is a schematic perspective view of apparatus constructed in accordance with the invention;

FIG. 2 is a schematic elevational view showing additional details of the apparatus of FIG. 1; and FIG. 3 is a block diagram illustrating the simultaneous use of a plurality of devices of the type shown in FIGS. 1 and 2.

Description of the preferred embodiment

FIG. 1 is a schematic representation in perspective of apparatus constructed in accordance with the invention and facilitates an understanding of the principals of the invention. FIG. 1 shows a radiation source 10 and galvanometer mirror 12 for generating an oscillographic trace on a recording medium such as a film 14. An opaque shield 16 blocks radiation from the source 10 toward the film 14 except through an aperture 18 formed in the shield 16. A convex lens 20 forms a real image at a point 22 of the light or other radation passing through the aperture 18.

The image formed at the point 22 is "real" in the conventional sense that it physically exists at that point so that it is visible if a motion picture screen is placed at that point to receive the image or if viewed from a location beyond that point towards the lens 20.

The image formed at the point 22 becomes the object for the system and is reflected by the galvanometer mirror 12 and an additional mirror 24 onto the film 14 at a given depth level 26.

The galvanometer mirror 12 is mounted pivotally about an axis 28. By conventional means known to those skilled in the art, the mirror 12 is pivoted back and forth about the axis 28 in a pattern representative of information from a downhole sensor. This pivoting or oscillation of the mirror 12 is of relatively small amplitude and gives rise to a back and forth movement of the image formed on the film 14 of greater amplitude but having the same characteristic pattern. The movement of the trace on the film 14 is in a direction generally normal to the projection of the axis 28 onto the plane of the film 14, as shown by the double-headed arrow 30.

The film 14 is rolled onto rollers or spools 32 and 34, and conventional means (not shown), is provided for unwinding the film from one of these spools and winding it onto the other. It is unimportant from the standpoint of the invention in which direction the film 14 moves, and the direction may be arbitrarily chosen to be upward as shown by the arrow 36. The combination of the movement of the film and the movement of the mirror 12 generates on the film a well log in Cartesian co-ordinates.

In accordance with the invention, means is provided for displacing the location of the oscillographic trace along the depth axis of the well log to compensate for the displacement of a downhole sensing device from a reference position. Specifically, means is provided for moving the lens 20 in a direction normal to its optical axis. If the lens 20 is moved downwardly to a position 20', the real image formed thereby is at a position 22', and the image thereof formed on the film 14 is at a location 26'. Similarly, if the lens 20 is moved upwardly to a position 20", the real image 22 is formed at a position 22", and the image thereof on the film 14 is at a position 26". The solid lines 40, 42, 44, 46, and 48 show the path of travel of the rays of interest in the case where the lens 20 is in the position shown in solid outline, and the dotted lines 50, 52, 54, 56, and 58 show the path of travel of the rays of interest in the case where the lens 20 is moved downwardly to the position 20'. Finally, the dotted lines 60, 62, 64, 66, and 68 show the path of travel of the rays of interest in the case where the lens 20 is moved upwardly to the position 20".

FIG. 2 shows a representative means for adjusting the position of the lens 20. The lens 20 is mounted in a holder 70 the upper portion 72 of which is flanged and provided with an internally-threaded aperture through which a screw 74 having a manually-engageable knob 76 is threaded. The screw 76 is rotatable about its longitudinal axis but secured against translation movement with respect to the panel or other means (not shown) for mounting the screw.

Those skilled in the art will understand that, within a given range, any adjustment of the position of the lens 20 is possible. That is, an operator of the apparatus need not select one of two or more locations for the lens but may select any one of an infinite number of locations for the lens within a given range. In accordance with the invention, therefore, the adjustment of the location of the oscillographic trace on the film is not limited to one of a few locations but can be any of an infinite number of locations within a given range.

FIG. 2 shows the galvanometer mirror 12 mounted within a housing 78 containing conventional means (not shown) for causing the oscillations previously referred to of the mirror 12. A cable connection 80 extends from the housing 28 to a conventional device 82 adapted to be lowered into a well bore 84 traversing earth formation 86. Within the device 82 are located a number of sensors $S_1$, $S_2 \ldots S_n$. Each senser is adapted to generate an electrical or other signal representative of a particular characteristic of the earth formation traversed by the well bore 84. One of these sensers, say the senser $S_1$, is electrically connected to the means for controlling the mirror 12, so that the movements of the mirror 12 accurately reflect the data sensed by the senser $S_1$.

It is not convenient or practical to locate all of the sensers at the same depth in the well, and the sensers are mounted in vertically-spaced-apart relation. All of the sensers, therefore, or all but one, are necessarily displaced from a reference position, which may be selected as one of the sensers or as a given part of the device 82. The present invention permits adjustment of the oscillographic traces to compensate for the vertical displacement of the sensers.

As FIG. 2 shows, a second lens 90 may be employed to generate an additional real image at a location 92, 92', or 92", of light passing through an aperture 94 from a light source 96. Selection of one of the points 92, 92', and 92", or points in between, is made by adjustment of the position of the lens 90. Adjustment of the position of the lens 90 is effected in a manner similar to the adjustment of the position of the lens 20. Specifically, a holder 100 having a flanged portion 102 at its upper end internally threaded to receive a threaded screw 104 mounts the lens 90. The screw 104 is provided with a knob 106 by which the screw can be rotated about its axis. The screw 106 is prevented from translational movement with respect to a panel board (not shown) or other mounting means for the screw. Rotation of the screw effects movement of the lens 90 in a direction perpendicular to its optical axis.

The oscillographic trace generated with the aid of the lens 20 is formed on the film 14 at a location 26, 26', or 26", as noted above. The oscillographic trace generated with the aid of the lens 90 is formed on a film 110 at a location 112, 112', or 112", or points in between, depending on the adjustment of the lens 90.

A first dichroic mirror 114 reflects a portion of the light traveling to the film 14 upperwardly for further reflection by a mirror 116 onto a viewing screen 118, and a second dichroic mirror 120 intercepts a portion of the light passing to the film 110 and reflects it upwardly for further reflection by a mirror 122 onto the viewing screen 118. The portion of the light not reflected by the mirrors 114 and 120 is transmitted to the films 14 and 110, respectively.

An additional lamp 124 transmits light through an aperture 126 for reflection by the mirror 12 and mirrors 128 and 130 onto the viewing screen 118.

The ratio of the speed of the film 14 to the speed of the downhole senser array is typically different from the ratio of the speed of the film 110 to the speed of the downhole senser array, so that, for example, a "regular" log (in which two inches or another convenient length of film corresponds to 100 feet of the hole) is produced on one film while an "expanded" log (in which five inches or another convenient length of film corresponds to 100 feet of the hole) is produced on the other. In such case, the vertical displacement of the beams for depth correction on the two-inch log must of course be less than the vertical displacement of the counterpart beams on the five-inch log. In accordance with the invention, the requisite independent adjustment for each galvanometer is facilitated, and the invention thus marks a significant advance in the art.

Prisms 132 are provided to correct for the hyperbolic curve otherwise traced by the extra-axial galvanometer beams on a flat image surface.

The apparatus of FIG. 2 thus permits the adjustment of the relative positions of the oscillographic traces formed on the films 14 and 110 to any desired value within prescribed limits.

It is noted that all of the information recorded on the films 14 and 110 and displayed on the viewing screen 118 is generated with the aid of a single galvanometer mirror 12. This galvanometer mirror moves in accordance with information from a single sensing means, which, it was assumed above, is the senser $S_1$. Each of the other sensers $S_2 \ldots S_n$ is connected by leads run through the cable 80 to a different galvanometer (only one galvanometer being shown). Thus, as FIG. 3 shows, there is in effect a separate recording channel $R_1, R_2, R_3 \ldots R_n$ for each senser-galvanometer combination. The information in each recording channel can be readily correlated in accordance with the present invention with the information in every other recording channel. For example, all of the recording channels may make use of the same two films 14 and 110, so that a total of $n$ oscillographic traces is produced on each of the films. Each oscillographic trace is adjusted is accordance with the invention so that, notwithstanding the depth separation of the downhole sensing devices, the traces at any co-ordinate along the depth axis of the completed well log represent information obtained at the same depth in the well bore.

Thus there is provided in accordance with the invention novel and highly effective apparatus and methods facilitating compensation for the depth separation of downhole sensing devices information from which is being simultaneously recorded. The apparatus of the invention permits adjustment to an infinite number of positions within a selected range and is simple, rugged, and economical to manufacture and repair.

Many modifications of the representative embodiment disclosed herein will readily occur to those skilled in the art. For example, use of the mirror 24, shown in FIG. 1 but not FIG. 2, is optional. Also, means 134 may be provided for adjusting the position of the shield 16. Also, recording media other than photographic film may be employed.

I claim:

1. In a method of compensating for depth separation of first and second downhole sensing means during the simultaneous recording of information from said sensing means on photosensitive film means, the steps comprising directing radiation from first and second light sources through first and second lenses, respectively, to form first and second real images in space, reflecting said first and second images by first and second mirror means, respectively, onto said photosensitive film means, moving said first and second mirror means to generate first and second oscillographic traces, respectively, on said film means, and moving at least one of said first and second lenses to adjust the relative position of said traces.

2. In recording apparatus, the combination of a source of light, lens means for forming a real image of said source of light, mirror means for reflecting an image of said real image onto a photosensitive film means, and means for moving said lens means in a direction substantially perpendicular to its optical axis to change the point at which said image reflected by said mirror means impinges on said film means.

3. In recording apparatus having a radiation source, a radiation-responsive recording medium in spaced-apart relation to said radiation source, channeling means operatively associated with said radiation source and said recording medium for channeling radiation from said radiation source to said recording medium to form an image on said recording medium, and, remotely located therefrom, sensing means for sensing a characteristic to be recorded, said channeling means including galvanometer means operatively associated with and responsive to said sensing means for effecting a first displacement of said image on said recording medium in accordance with information from said sensing means, the improvement comprising the combination of compensating means for effecting a second displacement of said image on said recording medium to compensate for displacement of said sensing means from a reference position and adjusting means for adjusting said compensating means so that said second displacement can be made to assume any value within prescribed limits, said compensating means being included in said channeling means and comprising a lens through which said radiation passes en route from said radiation source to said recording medium, said adjusting means comprising means movably mounting said lens, said lens being convex, having an axis extending parallel to the direction in which said radiation moves in passing therethrough, and forming a real image of said radiation source, and said adjusting means translating said lens in a direction normal to said axis.

4. Recording apparatus comprising, in combination, a radiation source, a radiation-responsive recording medium in spaced-apart relation to said radiation source, a plurality of channeling means operatively associated with said rediation source and said recording medium for channeling radiation in separate channels from said radiation source to said recording medium to form a plurality of images on said recording medium, a plurality of vertically-spaced-apart downhole sensing means for sensing a plurality of characteristics of earth formations traversed by a borehole, each of said channeling means including a mask formed with an aperture therein mounted adjacent to said radiation source, a lens mounted adjacent to said aperture for forming a real image thereof, and galvanometer means operatively associated with and responsive to a corresponding one of said sensing means for effecting a first displacement of a corresponding one of said images on said recording medium in accordance with information from said corresponding one of said sensing means, and a plurality of adjusting means respectively mounting said lenses to effect independent second displacements of said images to any values within prescribed limits in order to compensate for the vertical separation of said sensing means.

References Cited

UNITED STATES PATENTS

| 1,672,894 | 6/1928 | Legg | 346—109 |
| 2,440,971 | 5/1948 | Palmer | 346—49 |
| 2,976,106 | 3/1961 | Piety | 346—109 |
| 3,045,241 | 7/1962 | Savit | 346—109 |

RICHARD B. WILKINSON, Primary Examiner

JOSEPH W. HARTARY, Assistant Examiner

U.S. Cl. X.R.

346—109